United States Patent [19]

Lundquist, deceased

[11] 4,148,443
[45] Apr. 10, 1979

[54] TAPE CARTRIDGE

[75] Inventor: James A. Lundquist, deceased, late of Lindenwold, N.J., by Harvel Industries Corp., assignee

[73] Assignee: Harvel Industries Corp., Wheeling, Ill.

[21] Appl. No.: 868,186

[22] Filed: Jan. 9, 1978

Related U.S. Application Data

[63] Continuation of Ser. No. 667,526, Mar. 16, 1977, abandoned.

[51] Int. Cl.² ............................................. G11B 23/10
[52] U.S. Cl. ............................ 242/55.19 A; 242/198; 366/93
[58] Field of Search ................ 242/55.19 A, 55.19 R, 242/198, 76; 366/93

[56] References Cited

U.S. PATENT DOCUMENTS

| | | | |
|---|---|---|---|
| 2,876,005 | 3/1959 | Cash | 242/55.19 A |
| 3,259,331 | 7/1966 | Liddle | 242/198 X |
| 3,265,317 | 8/1966 | Liang et al. | 242/198 X |
| 3,637,152 | 1/1972 | Okamoto | 242/55.19 A |
| 3,638,874 | 2/1972 | Naito | 242/55.19 A |

*Primary Examiner*—Billy S. Taylor
*Attorney, Agent, or Firm*—Nicholas L. Coch; Eugene E. Renz, Jr.

[57] ABSTRACT

A tape cartridge for use in the reproduction of sound recordings on a tape is characterized by a brake mechanism which moves in a linear direction toward and away from the rotating reel and hub which carry the tape. The brake mechanism consists of a unitary structure which is guided between two upstanding walls within the cartridge and a spring which is operatively connected to the unitary structure and urges it toward the reel. A pawl like projecting member is positioned on the outer periphery of the unitary structure and is designed to engage any one of the plurality of openings in the reel thereby preventing rotation of the reel. Disengagement of the pawl member from the reel enables rotation of the reel. The linear motion of the unitary brake structure enables the cartridge to be properly aligned when positioned within the tape recorder machine resulting in an even pressure pad contact and tape tracking.

1 Claim, 3 Drawing Figures

TAPE CARTRIDGE

This is a continuation of application Ser. No. 667,526 filed Mar. 16, 1977, and now abandoned.

FIELD OF INVENTION

This invention relates to tape cartridges on the type useful in recording and reproducing systems, and more specifically, to such a tape cartridge assembly in which a specially designed brake mechanism is employed.

DESCRIPTION OF THE PRIOR ART

Tape cartridges for sound recording and reproducing systems have experienced a substantial increase in popularity in recent years. Of particular commercial significance has been the widespread acceptance of these devices in the music industry as well as in the general business community and in the home. Of necessity, these devices have improved somewhat as the demand increases. However, certain problems relating to the manufacture and operation of these devices remain unsolved.

Generally, a cartridge of this type is provided with a tape on which sound is recorded. The tape is wound on the hub of a rotatable reel and a portion of the tape passes through an opening at the front of the cartridge. The entire cartridge must be inserted into a receptacle in a tape playback machine where the tape is properly aligned and the recorded sounds are reproduced by the machine's playback mechanism which contacts the exposed portion of the tape at the front of the cartridge. Obviously, if the alignment is not properly carried out, the cartridge will skew or rotate and the sounds will not be faithfully reproduced.

The cartridge includes a brake actuator which functions to protect the reel from inadvertant rotation when the cartridge is not being played. There are several types of brake mechanisms currently available. A typical brake device includes a projecting member which is effective to contact either the tape or the reel and stop further rotation thereof. Such devices also include a spring which places the projecting member under a force normally urging it into engagement with the reel or tape. This spring force is counteracted by an actuating mechanism in the playback unit when it is desired to "play" the tape. In order to effect the release of the projecting member, either the spring or the member has a portion thereof extending across an opening in the cartridge case and acting as a lever arm. This extended arm is contaced by a rigid piece in the playback machine when the cartridge is inserted into the receptable and it is the coaction of the lever arm and rigid piece which operates the brake. However, in all presently known devices, the lever arm moves in an arcuate, nonlinear manner when so engaged thereby setting up a force vector on the cartridge which opposes its aligned position in the playback unit. This is, of course, most desirable since it can cause improper alignment of the tape in the playback unit.

Furthermore, presently available brake mechanisms, in many cases, are difficult and expensive to construct. The spring or the movable member must be staked or welded to the cartridge casing, often requiring special tools and a great amount of fabrication time. Still other brake mechanisms are arranged so that a projecting member engages the tape instead of the reel thereby reducing tape life. Generally, due to their complex design, few brake assemblies are capable of being replaced in the field and this is so despite the desirability of having the brake assembly easily replaced.

DESCRIPTION OF THE INVENTION

It is the primary object of this invention to provide a tape cartridge assembly which includes a brake mechanism which aids in the alignment of the cartridge by moving substantially in a linear direction when actuated and deactuated.

It is another object of this invention to provide a tape cartridge which is simple in construction and economical to manufacture.

It is still another object of this invention to provide a tape cartridge in which the brake mechanism consists of a unitary piece which is not staked or welded to the cartridge housing and the spring force is provided by a separate, easily assembled spring device.

The objects of the invention are accomplished by a tape cartridge assembly which consists of a base or supporting member, a rotatable reel having a hub which carries the magnetic tape, and a brake mechanism operatively positioned in the cartridge and effective in a first position to secure the reel from inadvertant rotation and in a second position, to release the reel for rotation. The brake mechanism consists of a unitary part or actuator which moves as a unit toward and away from the reel in a linear motion. A spring is separately positioned on the support member and includes an arm which engages the actuator and urges it toward the reel. A pawl like projecting finger extends from the actuator at its outer periphery and is designed to engage any one of a plurality of detents or openings in the reel thereby preventing rotation of the reel and tape. While at rest in the cartridge, the actuator is normally in a position of being urged into engagement with the reel so that rotation is prevented. However, when the cartridge is within a tape playback unit, the actuator is engaged by a member in the playback unit and is moved linearly away from the reel thereby releasing the reel and tape for rotation. This movement of the actuator may occur immediately upon cartridge insertion in some units, while in other units the brake is released only when the tape is actually played. Still other units are equipped with a manually controlled "ready" position in which the brake may be fully or partially released pending the play command.

In order to guide the actuator during its straight line movement toward and away from the reel, the cartridge includes guide means which, in one embodiment, comprises a pair of rigid, spaced upstanding walls positioned on each side of the actuator. These walls in effect form a channel through which the actuator moves and function to prevent lateral movement of the actuator. Several tabs project from the upper part of these walls over the actuator during its movement and function to contain the actuator in a vertical direction. During the movement of the actuator, the bottom portion of the actuator moves along the base of the cartridge while the upper portion of the actuator moves under the guide tabs.

The actuator is itself constructed preferably as a unitary piece having side walls which enclose an opening in the central section of the actuator. The opening in the central section of the actuator is substantially in registration with an opening through the base wall of the cartridge housing. This combination of openings is employed to permit the actuator to be engaged when within the playback unit so that it may be moved to a brake or to a release position. To facilitate such engagement, the actuator is provided with a crossbar which extends across the central opening. This crossbar is integrally connected to the remainder of the actuator so that when it is contacted by a moving member in the playback machine, the entire actuator moves away from the reel. When the force is removed from the crossbar, the spring force returns the actuator to its normal position to its normal position where it engages the reel and stops the tape.

DESCRIPTION OF THE DRAWINGS

The above-mentioned objects and other objects are satisfied by the present invention as described herein particularly when considered in conjunction with the drawings, in which.

Figure 1:
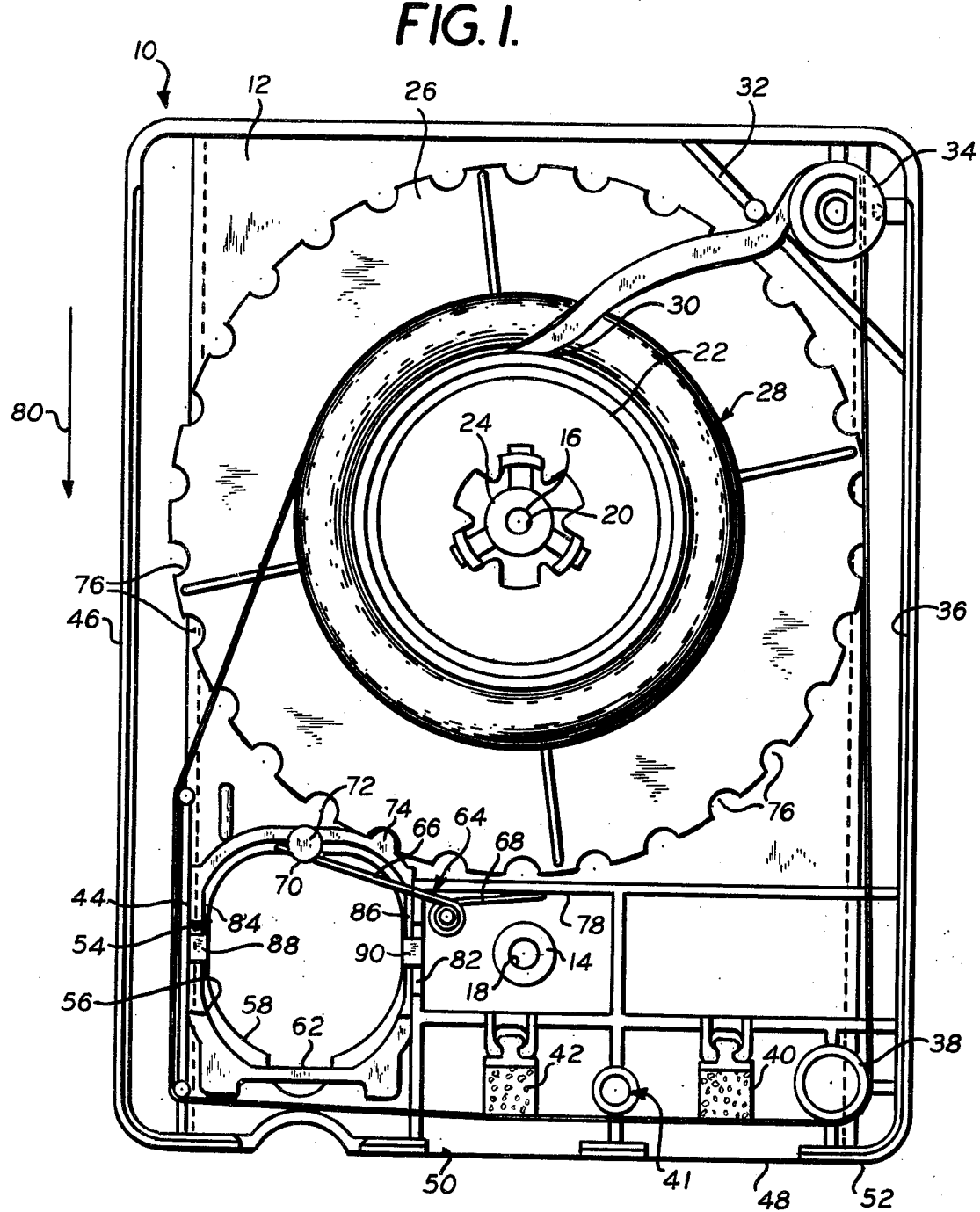
FIG. 1 is a top plan view of the cartridge assembly of the invention with the cover removed and illustrating the brake actuator in a normal braking position.

Referring now to the drawings, and specifically to FIG. 1, there is illustrated a tape cartridge assembly generally indicated by the numeral 10. The cartridge 10 includes a support base 12 from which posts 14 and 16 extend upwardly. These posts have center holes 18 and 20 respectively which may be threaded so as to receive threaded bolts to secure a cover (not shown) to the cartridge. The post 16 also functions as a bushing for the reel 26 which is rotatably positioned over the post 16 by means of its annular center column 24. A hub 22 is attached to the reel 26 and forms an integral unit therewith.

The hub 22 functions to carry a tape 28 which is wound continuously upon itself so that when rotated in a forward direction, continuous play and replay of the sounds recorded thereon may be reproduced. When the hub and reel rotate, the tape 28 is fed from the innermost portion 30 nearest the hub 22 and passes over a partition 32, to a rear corner post 34. The tape 28 then passes around the corner post 34 along side wall 36 of the cartridge 10, past front corner post 38 and past the pressure pad 40, around center wrap past 41, and past pressure pad 42. The tape then moves between guide wall 44 and side wall 46 back toward hub 22 where it is taken up into a single pack. Directly in front of pressure pads 40 and 42 are openings 48 and 50 in front cartridge wall 52. It is at these openings that the tape 28 is exposed for contact by the playback mechanism when the cartridge 10 is inserted into a playback machine (not shown). The exposed tape is guided by tape guides (not shown) in the playback machine and must be properly aligned for proper recording and reproduction.

Figure 2:
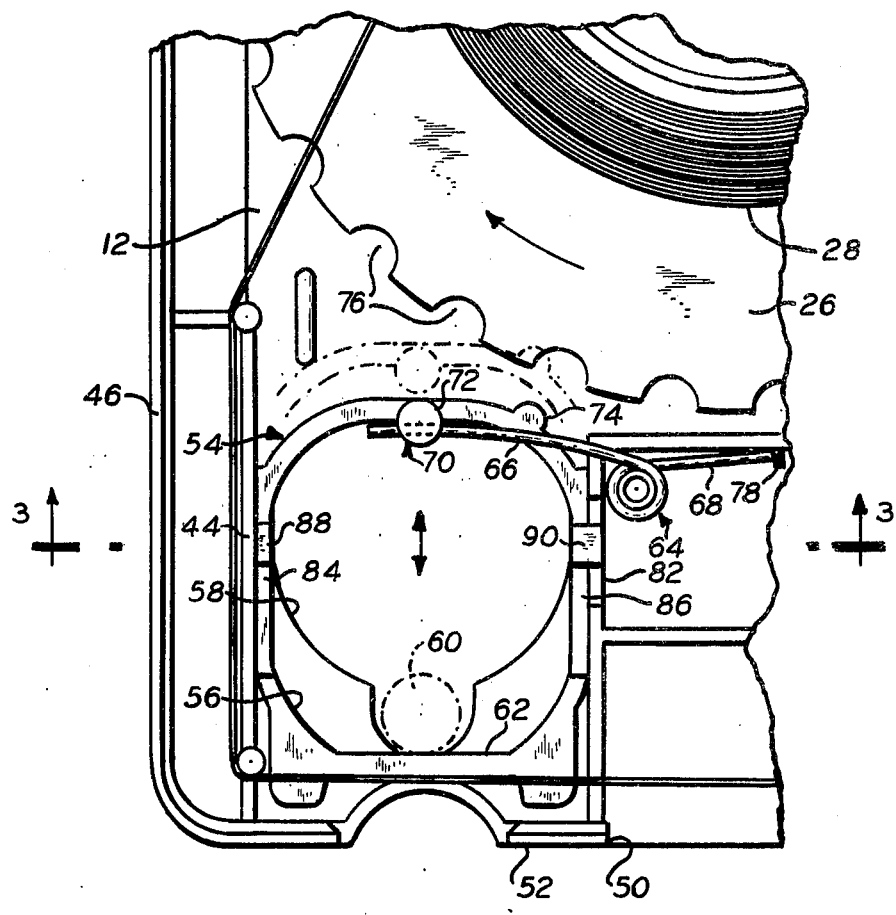
FIG. 2 is a partial top plan view of the assembly of FIG. 1 with the actuator in a withdrawn position.
Figure 3:
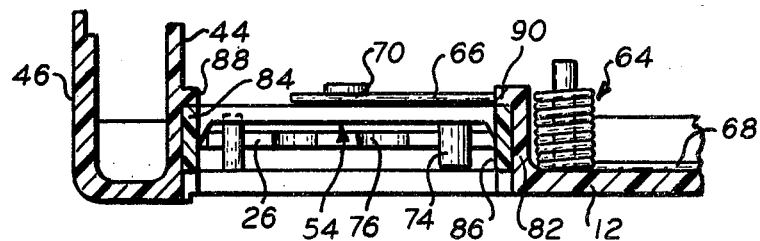
FIG. 3 is a front elevational view in section of the brake actuator and guide means within the assembly of FIG. 1.

Referring to FIGS. 1, 2 and 3, a brake actuator 54 is positioned adjacent the reel 26 near the front wall 52 of the cartridge. The actuator 54 is a unitary thin-walled structure which closes upon itself and defines a large central opening 56. This opening 56 is substantially in registration with an opening 58 in the support base 12. It is through these openings 56 and 58 that an actuating arm 60 (FIG. 2) extends and moves the actuator 54 from a first position shown in FIG. 1 to a second position shown in FIG. 2. The arm 60 is situated in a playback machine and it is when the cartridge assembly 10 is inserted into or played by such a machine that this arm 60 coacts with the brake 54. Actual contact is made by arm 60 with lever arm 62 upon the operation of a start button on the playback machine by the operator, by an automatic control device, by the actuation of a switch, by manual insertion of the cartridge or by any other similar means.

As illustrated best in FIG. 1, the actuator 54 is placed under constant pressure by spring 64. This spring 64 is a conventional coiled wire with extensions 66 and 68. Extension 66 is positioned in a groove 70 formed in the portion 72 of actuator 54 and places the actuator under a pressure sufficient to urge it toward reel 26. This causes a small projection or finger 74 to enter any one of the many openings 76 in the periphery of the reel 26 or to rest against the periphery of the reel in between openings. The pressure of the spring 64 and the blocking action of the finger 74 lock the reel and prevent tape rotation. When the finger 74 is withdrawn due to the counter force of the arm 60 (FIG. 2), the reel is free to rotate and the tape may then be played. The other extension 63 of spring 64 engages wall 78 and holds the spring under proper tension which is conventionally between 6.5 and 8.5 ounces for this type of unit.

It will be appreciated that the cartridge assembly 10 is inserted into a playback machine in a substantially linear manner in the direction of the arrow 80 in FIG. 1. Alignment of the tape 28 is critical and once the cartridge 10 is in place it is important that such alignment not be disturbed. Presently available cartridges of the type described include brake devices which do not aid the alignment of the cartridge when actuated and deactuated. Rather the part comparable to lever arm 62 is, in prior art devices, free to move in an arcuate or non-linear manner causing the cartridge to tend to be misaligned. It will be noted however that the brake actuator 54 moves in a linear direction identical to the direction of insertion and withdrawal of the cartridge (arrow 80) as shown by the relative positions of the actuator in FIGS. 1 and 2. This linear movement is assisted by guide walls 44 and 82 which are positioned immediately adjacent the side portions 84 and 86 of actuator 54 and in effect form a channel within which the actuator reciprocates. The smoothness of surface finish on both the guide walls 44 and 82 and the side portions 84 and 86 as well as on the support base 12 enables a free motion of the actuator to occur. The actuator slides beneath tabs 88 and 90 which extend outwardly from guide walls 44 and 82 and function to retain the actuator in a proper operating position.

In summary, the brake actuator 54 is normally in the position shown in FIG. 1, that is, urged into engagement with reel 26 by spring 64. This prevents rotation of the tape during normal handling of the cartridge. However, when the cartridge is inserted into a playback machine and a start or play button is depressed, the actuator 54 is forced against spring pressure to the position shown in FIG. 2. When tape play is stopped, or when actuating arm 60 is otherwise released, actuator 54 springs back to the position shown in FIG. 1. The motion of the actuator 54 during these actuation and deactuation periods is linear and is in a direction substantially parallel to the longitudinal axis of the cartridge itself. This linear motion is greatly advantageous to the proper operation of the tape since the action of the brake mechanism serves to aid in correctly positioning an improperly positioned cartridge in that its operation when engaged tends to pull the cartridge squarely into the playback machine's heads.

An additional advantage of the present invention is the ease with which the cartridge, and specifically the brake actuator, may be assembled. It is significant that the actuator 54 is not staked or welded to the cartridge housing, nor is the spring 64 permanently secured to the housing. Assembly time, and field replacement, therefore, is greatly reduced. Furthermore, replacement of these parts after a normal period of use is readily accomplished. From the foregoing it will be appreciated that the subject invention solves several difficult problems heretofor affecting cartridge assemblies of the type described. It will be further appreciated that the description of the preferred embodiment illustrated is intended to illustrate one form of the invention and that a number of modifications may be made without departing from the scope of the invention.

What is claimed is:

1. A tape cartridge assembly comprising a base means, reel means operatively connected to said base means and effective to rotate relative to said base means, said reel means having a plurality of openings positioned about the outer periphery thereof, brake means comprising a unitary, thin-walled, substantially flat structure having side walls, said structure resting entirely on said base means and effective when urged to slidably move as a unit reciprocally relative to said base means toward and away from said reel means in a substantially linear path, said brake means having a member projecting from the outer surface nearest the openings on said reel means and effective to engage one of said openings or fall between openings on said reel means thereby preventing further rotation thereof, spaced wall means projecting upwardly from said base means and extending in the direction of movement of said brake means and positioned adjacent said side walls of said brake means thereby to form guide means for directing the linear motion of said brake means and restrain lateral movement thereof, said brake means having an opening between said side walls and including cross piece extending between said side walls and across said opening, said base means also having an opening therethrough directly below said cross piece whereby an external force means extending through said base means opening engages said cross piece and moves said brake means out of engagement with said reel means, tab means operatively connected to said guide means and extending over said brake means in spaced superposed relation thereto and effective to restrain movement of said brake means away from said base means, said brake means including a part extending upwardly therefrom having a peripheral groove therein, and spring means resting in said groove of said brake means and effective to urge said brake means toward said reel means, said brake means being free of connection with said guide means and tab means thereby being readily removable and replaceable when worn.

* * * * *